United States Patent
Carnevale et al.

(10) Patent No.: US 6,850,671 B2
(45) Date of Patent: Feb. 1, 2005

(54) OPTICAL CIRCUIT HAVING LEGS IN A STACKED CONFIGURATION AND AN ASSOCIATED FABRICATION METHOD

(76) Inventors: Sharon Carnevale, 1600 Lee Pearson Rd., Granite Falls, NC (US) 28630; Randy Bumgarner, 3750 Pinecrest Dr., NE., Hickory, NC (US) 28601; Michael Hughes, 1374 Austin La., Hickory, NC (US) 28602; James L. Sorosiak, 15338 Aberfield Rd., Huntersville, NC (US) 28078

(*) Notice: Subject to any disclaimer, the term of this patent is extended or adjusted under 35 U.S.C. 154(b) by 107 days.

(21) Appl. No.: 10/099,665

(22) Filed: Mar. 15, 2002

(65) Prior Publication Data

US 2003/0174953 A1 Sep. 18, 2003

(51) Int. Cl.[7] .............................. G02B 6/26; G02B 6/36
(52) U.S. Cl. ............................ 385/39; 385/53; 385/115
(58) Field of Search ............................ 385/39, 42, 53, 385/54, 76, 77, 114, 115, 134, 147, 14, 129–132, 120, 121

(56) References Cited

U.S. PATENT DOCUMENTS 6,240,232 B1 * 5/2001 Schneider et al. .......... 385/129
2002/0015563 A1 * 2/2002 Murakami et al. ............ 385/53

* cited by examiner

Primary Examiner—Akm Enayet Ullah
Assistant Examiner—Kevin S. Wood

(57) ABSTRACT

An optical circuit is provided having a plurality of legs, each of which may have one or more optical fibers bound together by a matrix material, arranged in a stacked configuration in such a manner as to reduce, if not eliminate, the stress to which the optical fibers are subjected. The optical circuit includes a main body having a flexible substrate and a plurality of optical fibers mounted upon the substrate and lying in a common plane. The plurality of legs extend outwardly from an edge of the main body. The legs are disposed in a stacked configuration in which at least one leg overlies another leg. As such, at least one leg lies at least partially outside of the common plane defined by the substrate. A method for fabricating the optical circuit is also provided.

21 Claims, 4 Drawing Sheets

OPTICAL CIRCUIT HAVING LEGS IN A STACKED CONFIGURATION AND AN ASSOCIATED FABRICATION METHOD

FIELD OF THE INVENTION

The present invention relates generally to flexible optical circuits and associated fabrication methods and, more particularly, to flexible optical circuits having a plurality of legs disposed in a stacked configuration.

BACKGROUND OF THE INVENTION

Flexible optical circuits are utilized in a wide variety of applications in which fiber management is desirable. For example, flexible optical circuits are commonly utilized as optical back planes to interconnect a number of printed circuit boards or the like. Similarly, flexible optical circuits can serve as ribbons of optical fibers in order to route the optical fibers in an organized fashion.

Regardless of the application, a flexible optical circuit is commonly formed of a plastic substrate, typically formed of a polyimide or similar types of engineering thermoplastic materials, such as polyetherimide or polybutylene terphthalate. Most commonly, however, the substrate is formed of Kapton™ polyimide. The substrate is coated with an adhesive, such as a silicone adhesive, and a plurality of optical fibers are placed upon the adhesive-coated substrate. In particular, the optical fibers are placed in a predetermined pattern upon the substrate in order to appropriately route the optical fibers. The flexible optical circuit is then completed by placing another layer over the optical fibers. For example, a flexible optical circuit can include another layer of the plastic material that forms a substrate in order to effectively sandwich the optical fibers between the layers of plastic. By way of example, the flexible optical circuit can include a layer formed of Kapton™ polyimide that overlies the optical fibers and is adhered to the substrate. Alternatively, a conformal coating can be applied so as to cover the substrate and the optical fibers adhered to the substrate. For example, a conformal coating of silicone can be sprayed on the substrate in order to cover the optical fibers as well as other portions of the substrate.

The optical fibers of a flexible optical circuit generally extend from a first end proximate one edge of the substrate, across the substrate to an opposed second end proximate another edge of the substrate. In one common application, flexible optical circuits are utilized to create and route ribbons of optical fibers. As such, the optical fibers are arranged in groups, at least in those regions proximate the edges of the substrate at which the optical fibers enter and exit the optical circuit. Each group of optical fibers may form a respective ribbon with the substrate serving as the matrix material to bind the optical fibers together. Depending upon the desired fiber count of a ribbon, the groups of optical fibers may have four, six, eight, twelve, sixteen or any other number of optical fibers. While the optical fibers may cross one another and follow various curved paths across a medial portion of the substrate to permit the optical fibers to be grouped differently proximate the different edges of the substrate, each group of optical fibers generally extends parallel to and is spaced from the other groups of optical fibers proximate an edge of the substrate. The relatively empty portions of the optical circuit between the groups of optical fibers proximate the edge of the substrate may then be removed to permit more independent movement of each ribbon of optical fibers. Generally, a respective fiber optic connector is also mounted upon the end portions of the optical fibers of each group.

Fiber optic connectors designed to mount upon and interconnect a greater number of optical fibers, typically arranged in the form of multiple ribbons, have been developed and are desirable for certain applications. Typically, these fiber optic connectors are designed to be mounted upon the end portions of a plurality of ribbons of optical fibers with the ribbons of optical fibers disposed in a stacked configuration so that one ribbon overlies another. As such, the fiber optic connector can permit the interconnection of a plurality of optical fibers arranged in a relatively dense manner.

In order to mount a fiber optic connector upon the end portions of a plurality of ribbons of optical fibers that extend outwardly from the main portion of a flexible optical circuit, the ribbons of optical fibers are moved into alignment with one another in a stacked configuration. As such, most, if not all, of the ribbons of optical fibers are bent somewhat in order to move the ribbons into alignment and to stack the ribbons in a multi-layered fashion that will be compatible with a typical fiber optic connector designed to receive a two-dimensional array of optical fibers. When bending the ribbons of optical fibers, stress is created on the optical fibers. As known to those skilled in the art, stress is disadvantageous for optical fibers and may introduce attenuation and have other deleterious performance effects.

In an attempt to reduce the stress to which the optical fibers are subjected, the ribbons of optical fibers have been made longer. While the lengthening of the ribbons of optical fibers reduces, to some extent, the stress to which the optical fibers are subjected, the increased length of the ribbons of optical fibers is oftentimes disadvantageous for fiber management and organization purposes. Moreover, while the stress to which the optical fibers is subjected may be reduced somewhat by increases in the length of the ribbons of optical fibers, the optical fibers will still be subjected to at least some stress which, in turn, degrades the performance of the flexible optical circuit.

It would therefore be desirable to provide an improved flexible optical circuit having a plurality of ribbons of optical fibers that may be more readily arranged in a stacked configuration for insertion into a fiber optic connector. In this regard, it would be desirable for the flexible optical circuit to be designed such that the ribbons of optical fibers may be arranged in a stacked configuration with only a minimal, if any, amount of stress placed upon the optical fibers as the optical fibers are arranged in the stacked configuration.

SUMMARY OF THE INVENTION

An improved optical circuit is therefore provided having a plurality of legs, each of which may have one or more optical fibers bound together by a matrix material, arranged in a stacked configuration in such a manner as to reduce, if not eliminate, the stress to which the optical fibers are subjected. As such, a fiber optic connector may be mounted upon the legs in the stacked configuration without degrading the performance of the optical circuit, i.e., without disadvantageously increasing the attenuation of the optical signals transmitted thereby. By facilitating the arrangement of the legs in a stacked configuration, the optical circuit of the present invention permits the legs to have relatively short lengths which, in turn, improves the fiber management and organization of the optical circuit. Moreover, the optical circuit of the present invention may advantageously permit the size of the main body to be reduced since the optical fibers need not be spread as widely as in conventional optical circuits. Additionally, an advantageous method for manufacturing an optical circuit having a plurality of legs arranged in a stacked configuration is also provided.

The optical circuit includes a main body having a flexible substrate and a plurality of optical fibers mounted upon the substrate. Typically, the optical fibers are mounted so as to lie in a common plane upon the substrate. The optical fibers are arranged in a plurality of groups proximate an edge of the substrate with each group including at least one optical fiber. The optical circuit also includes a plurality of legs extending outwardly from the edge of the main body. Each leg includes the optical fibers of a respective group and a matrix material for binding the optical fibers of the respective group together. The legs are disposed in a stacked configuration in which at least one leg overlies another leg. As such, at least one leg lies at least partially outside of the common plane defined by the substrate.

According to one aspect of the present invention, a first group of optical fibers extends toward a second group of optical fibers while the groups of optical fibers are supported by the substrate. Thus, each group of optical fibers may extend in a parallel spaced apart arrangement across a portion of the flexible substrate. However, other portions of the first and second groups of optical fibers may extend toward and be proximate one another. As such, the legs of the optical circuit that include these groups of optical fibers may be more readily stacked without imparting as much, if any, stress upon the optical fibers.

Although the substrate may serve as the matrix material in one embodiment, the matrix material of at least one leg and, more typically, of each leg, is generally a coating that is independent of the flexible substrate. By utilizing a coating, as opposed to the substrate, as the matrix material, the flexibility of the legs is enhanced, thereby further facilitating the arrangement of the legs in a stacked configuration with a reduction, if not an elimination, of the stress to which the optical fibers would otherwise be subjected.

According to yet another aspect of the present invention, the optical circuit includes first, second and third legs extending outwardly from the main body. According to this aspect of the present invention, the legs are disposed in a stacked configuration with the first and second legs transitioning within the main body of the optical circuit so as to overlie the third leg at different locations along the length of the third leg. Thus, the optical circuit of this aspect of the present invention advantageously permits three or more legs to be arranged in a stacked configuration with little, if any, stress imposed upon the optical fibers.

The optical circuit may also include a first fiber optic connector mounted upon the plurality of legs in the stacked configuration. In a typical configuration, each optical fiber extends from a respective first end upon which the first fiber optic connector is mounted, across the flexible substrate to an opposed second end. As such, the optical circuit may also include a plurality of second fiber optic connectors mounted upon respective groups of the optical fibers proximate the second ends of the optical fibers.

According to another aspect of the present invention, a method of fabricating an optical circuit is provided which arranges the optical fibers in a stacked configuration while reducing, if not eliminating, the stress otherwise imparted upon the optical fibers. According to this aspect, a main body having a flexible substrate and a plurality of groups of optical fibers proximate an edge of and adhered to the flexible substrate is provided. A first group of optical fibers is then positioned so as to overlie a second group of optical fibers, preferably while the second group of optical fibers remains supported by the substrate. For example, the first and second groups of optical fibers may be secured relative to one another once the first group of optical fibers has been positioned so as to overlie the second group of optical fibers. In order to secure the first and second groups of optical fibers, the first and second groups of optical fibers may be attached to opposite sides of an adhesive-coated spacer. Thereafter, the first group and, in some embodiments, the second group of optical fibers is coated with a matrix material while the first group of optical fibers remains positioned in an overlying relationship with respect to the second group of optical fibers. For example, the coating of the matrix material may be sprayed onto at least the first group of optical fibers and, in some embodiments, the second group of optical fibers as well. Once the coating has been applied, the first and second groups of optical fibers are released. In the embodiment in which the first and second groups of optical fibers are attached to opposite sides of an adhesive-coated spacer during the coating process, the first and second groups of optical fibers are released by removing the adhesive-coated spacer. In embodiments in which the resulting optical circuit will have three or more groups of optical fibers that are arranged in a stacked configuration, the process of positioning an additional group of optical fibers so as to overlie the first and second groups of optical fibers and thereafter coating the additional group of optical fibers is repeated for each additional group of optical fibers.

As such, the resulting optical circuit permits multiple legs to be arranged in a stacked, multi-layer configuration for insertion into a fiber optic connector, such as a high-count fiber optic connector adapted to receive a two-dimensional array of optical fibers. The construction of the optical circuit reduces, if not eliminates, the stress to which the optical fibers would otherwise be subjected. As a result, the optical performance of the optical circuit may be improved, such as by reducing any attenuation of the optical signals transmitted via the optical circuit. Moreover, the size of the optical circuit may be reduced by stacking the optical fibers.

BRIEF DESCRIPTION OF THE SEVERAL VIEWS OF THE DRAWINGS

Figure 1:
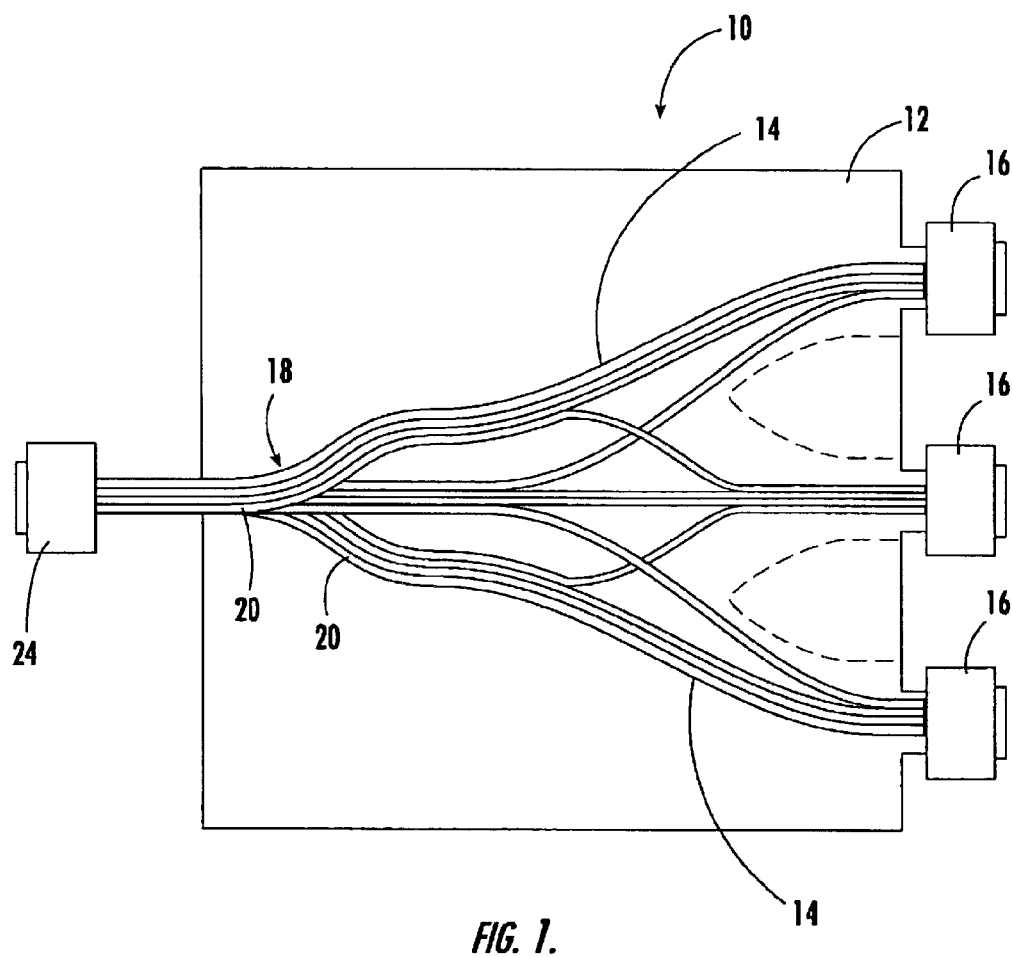
Figure 2:
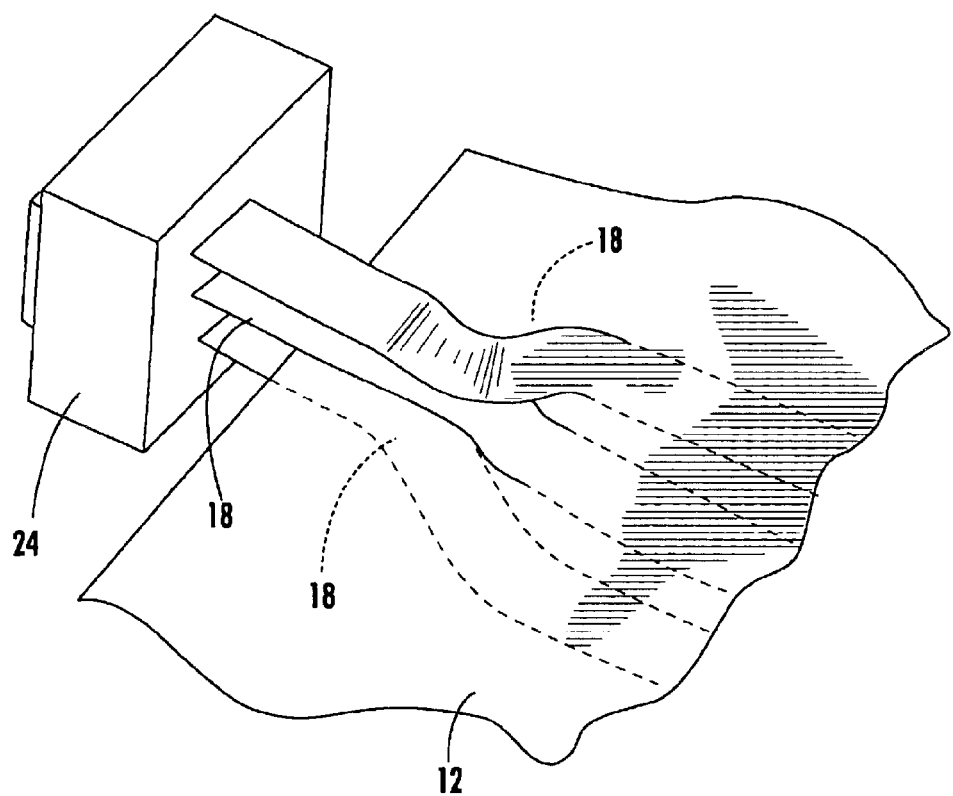
Figure 3:
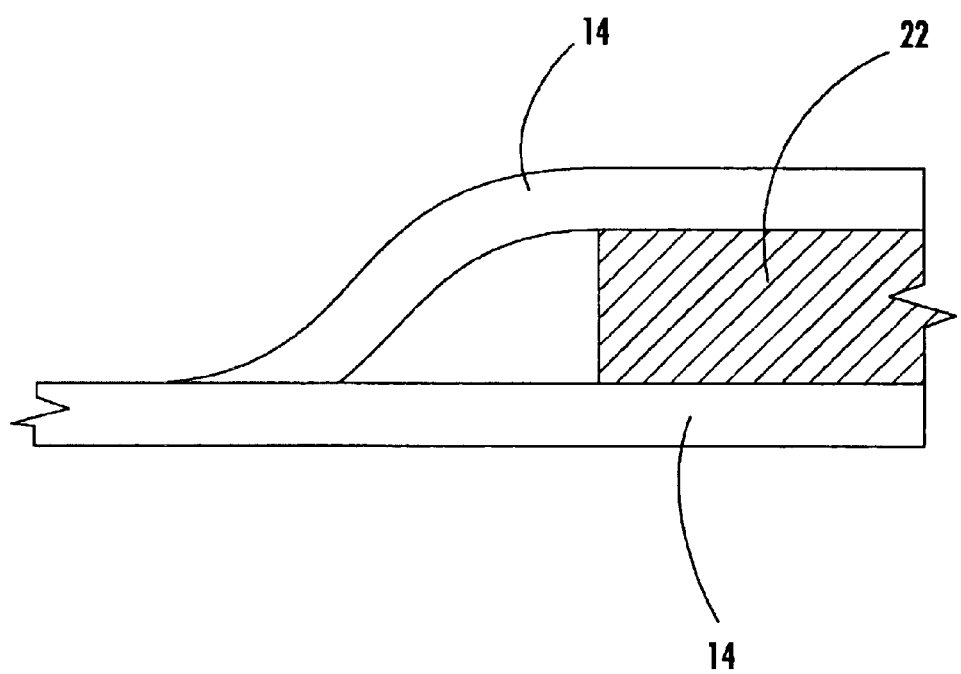
Figure 4:
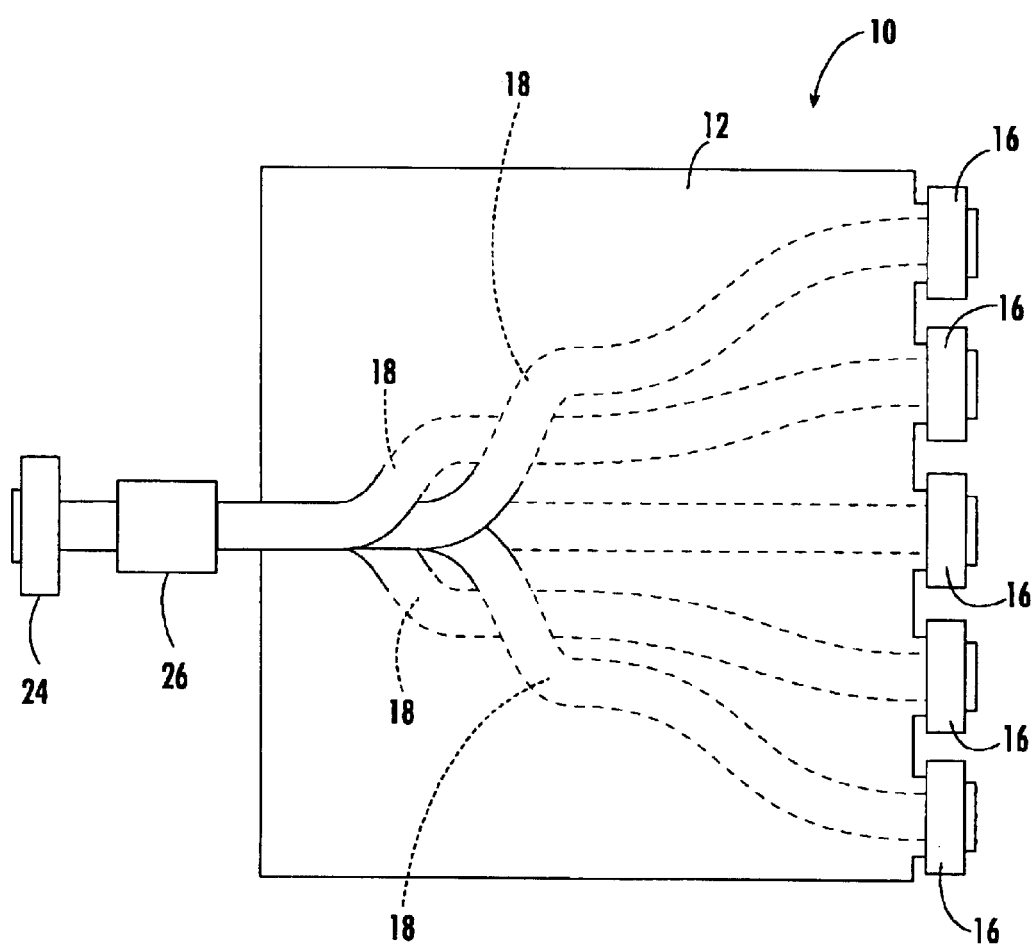

Having thus described the invention in general terms, reference will now be made to the accompanying drawings, which are not necessarily drawn to scale, and wherein:

FIG. 1 is a plan view of an optical circuit according to one embodiment of the present invention;

FIG. 2 is a fragmentary perspective view of a portion of the optical circuit of FIG. 1 depicting the stacked configuration of the legs;

FIG. 3 is a fragmentary side view of two groups of optical fibers spaced apart by an adhesive coated spacer in anticipation of being coated with a matrix material in accordance with one embodiment of the present invention; and FIG. 4 is a plan view of an optical circuit of another embodiment of the present invention depicting the manner in which the legs extend outwardly from different locations upon the main body.

DETAILED DESCRIPTION OF THE PREFERRED EMBODIMENTS

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, an optical circuit 10 according to one advantageous embodiment of the present invention is illustrated. The flexible optical circuit can be deployed in a variety of applications in order to route optical fibers in an organized and managed fashion. For example, the flexible optical circuit may permit a plurality of ribbons of optical fibers to be interconnected or cross-connected. As such, the flexible optical circuit may be utilized as an optical backplane or the like.

The flexible optical circuit 10 includes a substrate 12 and at least one and, more commonly, a plurality of optical fibers 14 disposed upon the substrate. The substrate is typically formed of a polyimide or similar types of engineering thermoplastic materials, such as polyethermide or polybutylene terphthalate. Most commonly, however, the substrate is formed of Kapton™ polyimide. As will be apparent, the optical fibers can be disposed upon the substrate in any desired pattern in order to provide the proper routing of the optical fibers. Typically, however, the optical fibers extend from beyond one edge of the substrate, across the substrate and beyond another edge of the substrate to facilitate connection with the optical fibers.

The optical fibers 14 are typically attached to the substrate 12 such that the position of the optical fibers relative to the substrate is fixed. As such, the flexible optical circuit 10 also generally includes an adhesive, such as silicone adhesive. The adhesive is typically disposed upon at least that portion of the substrate across which the optical fibers will be routed in order to attach the optical fibers to the substrate. More commonly, however, the entire substrate is coated with the adhesive. Once the optical fibers have been attached to the substrate, a conformal coating may be applied to the surface of the substrate to which the optical fibers are attached. In this regard, the conformal coating is typically formed of a relatively thin layer of silicone that is sprayed over the optical fibers and the substrate in order to protect the flexible optical circuit and to further secure the optical fibers to the substrate.

The substrate 12, the optical fibers 14 mounted thereupon and the conformal coating generally form the main body of the optical circuit 10 of the present invention. Within this main body, each optical fiber generally extends from a respective first end across at least a portion of the flexible substrate to an opposed second end. The first ends of the optical fibers are generally arranged in a plurality of groups with each group including at least one optical fiber. Similarly, the second ends of the optical fibers may be arranged in groups with each group again including at least one optical fiber. While the first ends of the optical fibers may be arranged in the same number of groups as the second ends of the optical fibers, the grouping of the optical fibers may differ. In this regard, the optical fibers may be routed such that the optical fibers that have first ends forming one group have opposed second ends that form portions of two or more other groups, as shown in FIG. 1.

Each group of optical fibers 14, at either end of the optical fibers, presents the optical fibers in a ribbonized format. Although the route of the optical fibers across the substrate 12 may vary, the optical circuit 10 of the illustrated embodiment includes groups formed by the first ends of the optical fibers that extend in a parallel, spaced-apart arrangement from one edge of the substrate toward a medial portion of the substrate. Additionally, fiber optic connectors 16 may be mounted upon respective groups formed by the first ends of the optical fibers to facilitate interconnection of the optical fibers with other optical fiber ribbons. To facilitate mounting of the fiber optic connectors, the first ends of the optical fibers preferably extend slightly beyond the substrate and the conformal coating to permit the optical fibers to be inserted into respective openings defined by the ferrule of the fiber optic connector. However, the substrate upon which the optical fibers are mounted typically extends into the connector boot and into the rearward end of the spring push element of the fiber optic connector. As such, a respective multifiber connector may be mounted upon each group formed by the first ends of the optical fibers.

As a result of the routing of the optical fibers 14, portions of the substrate 12 may not support any optical fibers. In the illustrated embodiment, for example, those portions of the substrate between the groups of the first ends of the optical fibers do not support any optical fibers. As such, these portions of the substrate designated by dashed lines in FIG. 1 may be removed, if desired, in order to further increase the flexibility of the optical circuit 10. Nevertheless, the resulting groups of optical fibers in ribbonized format form a portion of the main body of the optical circuit as a result of the optical fibers being mounted upon and extending across corresponding portions of the substrate.

The optical circuit 10 of the present invention is adapted to transition the groups formed by the second ends of the optical fibers 14 into a stacked configuration. To reduce the stress to which the optical fibers are subjected during this transition, the groups of optical fibers preferably converge towards one another while still supported by and adhered to the substrate 12. In the example in which the optical circuit includes first and second groups of optical fibers, at least one, if not both, of the groups is routed so as to extend toward the other. In the illustrated embodiment in which the groups formed by the first ends of the optical fibers extend in a parallel, spaced-apart arrangement from one edge of the substrate toward a medial portion of the substrate, the groups formed by the second ends of the optical fibers converge toward a common region of the substrate such that each of the groups formed by the second ends of the optical fibers are proximate one another. While this convergence may occur at various points upon the substrate, the convergence of the groups formed by the second ends of the optical fibers typically occurs proximate another edge of the substrate. Once the groups formed by the second ends of the optical fibers have converged, the groups of optical fibers transition to a stacked configuration in which at least one leg overlies another leg.

As shown in FIGS. 1 and 2, the transition to a stacked configuration requires at least one group of optical fibers 14 to be moved out of the common plane defined by the main body so as to overlie another group of optical fibers that remains in the common plane. As used herein, the positional relationship described as overlying is intended to merely describe the alignment of one leg to another such that the generally planar ribbons extend in parallel without implying any type of upward or downward orientation or any vertical orientations. While this transition could occur off the edge of the substrate 12, the transition to the stacked configuration generally occurs while at least one group of optical fibers remains adhered to and supported by the substrate. In this regard, the group of optical fibers that remains in the common plane remains adhered to and supported by the substrate, while the group of optical fibers that is moved out of the common plane is generally no longer adhered to or supported by the substrate. Moreover, since the conformal coating covers the optical fibers that are adhered to the substrate, the group of optical fibers that is moved out of the common plane is generally no longer coated with the conformal coating once the group of optical fibers separates from the substrate, i.e., the first end of the group of optical fibers supported by the substrate would generally be coated with the conformal coating while the second end of the group of optical fibers that is separated from and independent of the substrate is generally not coated with the conformal coating. Once the groups of optical fibers have transitioned into a stacked relationship, the groups of optical fibers can extend off the edge of the substrate and, in most embodiments, to a fiber optic connector 24 as described below.

Although the groups of optical fibers 14 that have separated from the substrate 12 and are arranged in a stacked configuration are not coated with the conformal coating, these groups of the optical fibers are ribbonized to form respective legs 18 that extend outwardly from the main body of the optical circuit. In order to ribbonize each group of the optical fibers in the stacked configuration, the second ends of the optical fibers of each group are preferably bound or fixed together by means of a matrix material 20. While various matrix materials may be utilized including the substrate in one embodiment, the matrix material of one advantageous embodiment is identical to the conformal coating that overlies the substrate 12 and, as such, may be a relatively thin layer of silicone that may be sprayed or otherwise applied to the second ends of the optical fibers. While the matrix materials may have various thicknesses, the matrix material of one embodiment has a thickness of about 10–20 mils. For each group, the second ends of the optical fibers in conjunction with the matrix material binding the second ends of the optical fibers together define a respective ribbonized leg 18 extending outwardly from the main body. By binding the second ends of the optical fibers 14 of each group together by means of a relatively thin and pliable matrix material 20, each leg 18 advantageously remains relatively flexible.

In order to facilitate the stacked configuration of the legs, the groups formed by the second ends of the optical fibers 14 are preferably positioned in an aligned overlying relationship prior to applying the matrix material 20, such as prior to spraying the conformal coating onto the second ends of the optical fibers. As such, the conformal coating will assist in retaining the legs in the stacked configuration.

While the matrix material 20 may be applied in various manners, one advantageous technique for positioning the groups formed by the second ends of the optical fibers 14 in a stacked configuration and then applying the matrix material will be described hereinafter. In this embodiment, one group formed by the second ends of the optical fibers is positioned so as to overlie another group formed by the second ends of the optical fibers. These groups of optical fibers are then temporarily secured in position while at least the first group of optical fibers is coated with the matrix material. While these groups of optical fibers may be secured in position in various manners, the method of this exemplary embodiment attaches these groups of optical fibers to opposite sides of an adhesive coated spacer 22 as shown in FIG. 3, while coating at least one group of the optical fibers with the matrix material. While various materials may be utilized as the adhesive coated spacer, a piece of double-sided tape may be positioned between these groups of optical fibers once these groups have been positioned in an aligned overlying relationship and the optical fibers may then be affixed to opposite sides of the double-sided tape. Once the groups of optical fibers have been affixed to opposite sides of the double-sided tape, at least the group of optical fibers that is separated from the substrate may be coated with the matrix material, such as by spraying the coating of the matrix material onto the optical fibers such that the matrix material coats and binds the optical fibers from the point at which the optical fibers separated from the substrate 12 and along their entire length. As described below, the other group of optical fibers may also be coated with the matrix material while secured in an aligned relationship.

As shown in FIGS. 2 and 3, one group of the optical fibers 14 is generally moved out of the common plane defined by the main body so as to overlie another group of optical fibers that may remain in the common plane. As such, the group of optical fibers that has been moved out of the common plane is coated with the matrix material 20. The group of optical fibers that remains in the common plane and is supported by the substrate 12 is also preferably ribbonized to form a respective leg. While the group of fibers that may remain in the common plane may utilize the substrate 12 and/or the conformal coating as the matrix material, the second end of this group of optical fibers is also preferably coated with the matrix material, such as by spraying the coating of the matrix material onto this group of optical fibers, once this group of optical fibers extends beyond the edge of the substrate. Once the matrix material has cured, the adhesive coated spacer 22, such as the double-sided tape, may be removed. While the legs 18 are typically free to move relative to one another following the removal of the adhesive coated spacer, the legs will generally tend to remain in a stacked configuration with one leg overlying the other as a result of the application of the coating while positioned in the stacked configuration.

This process may be repeated for multiple groups formed by the second ends of the optical fibers 14 such that three, four or more groups may be arranged in a stacked configuration. Typically, each additional group is individually positioned and then coated with a matrix material 20. For example, a third group formed by the second ends of the optical fibers may be positioned so as to overlie the legs formed by the first and second groups that have already been coated with the matrix material as described above. This third group is then held into position and is coated with the matrix material. As described above, the third group may be held in position by means of an adhesive coated spacer 22, such as double-sided tape, disposed between the third group and the group that immediately underlies the third group while the matrix material is applied, such as by spraying the matrix material onto the second ends of the optical fibers of the third group. Thereafter, the adhesive coated spacer, such as the double-sided tape, may be removed. While the leg 18 that includes the third group is then typically free to move relative to the other legs, the leg that includes the third group will generally tend to remain in the stacked configuration. This process may then be repeated in the same manner for fourth, fifth or other groups formed by the second ends of the optical fibers.

As described above, each of these other legs 18 also lie at least partially outside the common plane and are independent of the substrate 12 with the matrix material 20, instead, binding the second ends of the optical fibers 14 together. As such, the flexibility of each of these legs is thereby facilitated. In order to facilitate the positioning of the legs in a stacked configuration, each different group formed by the second ends of the optical fibers preferably extends outwardly from the main body at a location spaced from the edge of the substrate by a different distance, as shown in FIG. 4. In particular, each additional leg that is stacked upon other legs that have previously been positioned, such as the fourth leg stacked upon the first, second and third legs and the fifth leg stacked upon the first, second, third and fourth legs, etc., preferably extends outwardly from more medial or interior portion of the main body, i.e., from a portion of the main body that is further removed from the edge. By way of example, the fifth leg that is stacked upon the first four legs extends outwardly from a portion of the main body that is interior of the portions of the main body from which any of the first four legs extend outwardly, while the fourth leg extends outwardly from a portion of the main body that is interior of the portions of the main body from which the first, second and third legs extend, but interior of the portion of the main body from which the fifth leg extends. Thus, each additional leg will transition so as to overlie the other legs that have previously been positioned at different locations therealong. The spacing between those portions of the main body from which the different legs extend may vary depending upon the application.

Once each of the legs 18 have been disposed in the stacked configuration and coated with the matrix material 20, a fiber optic connector 24 may be mounted upon the plurality of legs in the stacked configuration. The fiber optic connector is typically a high count connector adapted to receive a two-dimensional array of optical fibers, such as those presented by the stacked configuration of the legs of the optical circuit 10 of the present invention. Prior to mounting the fiber optic connector upon the plurality of legs, however, a protective tube 26 may be slidably placed over the legs so as to further protect the region in which the plurality of legs are transitioning into the stacked arrangement. The tube is preferably somewhat flexible and flame retardant and, as such, may be formed of various materials. For example, the tube may be formed of a fluoropolymer, such as polyvinylchloride (PVC). The tube preferably fits relatively tightly about and conforms to the shape of the legs. In addition, the tube may be secured to the legs, such as by double-sided tape. Alternatively, the tube may be constructed of a material such as a room temperature vulcanizing (RTV) elastomer that may be shrink fit over the legs to secure the tube to the legs.

As such, the resulting optical circuit 10 permits multiple legs to be arranged in a stacked, multi-layer configuration for insertion into a fiber optic connector 24, such as a high-count fiber optic connector adapted to receive a two-dimensional array of optical fibers 14. The optical circuit therefore permits the plurality of ribbons formed by the first ends of the optical fibers with fiber optic connectors 16 mounted thereupon to be transitioned into a dense, two-dimensional array of optical fibers with a high-count fiber optic connector mounted thereupon. Advantageously, the construction of the optical circuit reduces, if not eliminates, the stress to which the optical fibers would otherwise be subjected in making this transition. As a result, the optical performance of the optical circuit is improved, such as by reducing any attenuation of the optical signals transmitted via the optical circuit.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical circuit comprising:
    a main body comprising:
        a flexible substrate; and
        a plurality of optical fibers mounted so as to lie in a common plane upon said substrate, said optical fibers arranged in a plurality of groups proximate an edge of said substrate with each group including at least one optical fiber, said optical fibers of a first group extending toward said optical fibers of a second group; and
    a plurality of legs extending outwardly from the edge of said main body, each leg comprising said optical fibers of a respective group and a matrix material for binding said optical fibers of the respective group together, said legs disposed in a stacked configuration in which at least one leg overlies another leg such that at least one leg lies at least partially outside of the common plane.

2. An optical circuit according to claim 1 wherein said plurality of groups of optical fibers extend in a parallel, spaced apart arrangement across a portion of said flexible substrate, and wherein said second group of optical fibers overlies said first group of optical fibers while said first group of optical fibers is supported by said flexible substrate.

3. An optical circuit according to claim 1 further comprising a first fiber optic connector mounted upon said plurality of legs in the stacked configuration.

4. An optical circuit according to claim 3 further comprising a plurality of second fiber optic connectors mounted upon respective groups of said optical fibers proximate another edge of said main body.

5. An optical circuit according to claim 1 wherein said matrix material of at least one leg comprises a coating such that the respective leg is independent of the flexible substrate.

6. An optical circuit comprising:
    a main body comprising:
        a flexible substrate; and
        a plurality of optical fibers mounted upon said substrate, said optical fibers arranged in a plurality of groups proximate an edge of said substrate with each group including at least one optical fiber; and
    a plurality of legs extending outwardly from said main body in a stacked configuration in which at least one leg overlies another leg, each leg comprising said optical fibers of a respective group and a matrix material for binding said optical fibers of the respective group together, said matrix material of at least one leg comprising a coating such that the respective leg is independent of the flexible substrate.

7. An optical circuit according to claim 6 further comprising a first fiber optic connector mounted upon said plurality of legs in the stacked configuration.

8. An optical circuit according to claim 7 wherein each optical fiber extends from a respective first end upon which said first fiber optic connector is mounted, across said flexible substrate to an opposed second end, and wherein the optical circuit further comprises a plurality of second fiber optic connectors mounted upon the second ends of the optical fibers of respective groups.

9. An optical circuit according to claim 6 wherein said plurality of groups of optical fibers extend in a parallel, spaced apart arrangement across a portion of said flexible substrate, and wherein said optical fibers of one group extend toward said optical fibers of another group while each group of optical fibers is supported by said flexible substrate.

10. An optical circuit according to claim 9 wherein the group of optical fibers that extends toward the other group of optical fibers separates from said flexible substrate and transitions so as to overlie the other group of optical fibers while the other group of optical fibers is supported by said flexible substrate.

11. An optical circuit comprising:
a main body comprising:
a flexible substrate; and
a plurality of optical fibers mounted upon said substrate and arranged in a plurality of groups proximate an edge of said substrate with each group including at least one optical fiber; and
a plurality of legs including first, second and third legs extending outwardly from said main body, each leg comprising said optical fibers of a respective group and a matrix material for binding said optical fibers of the respective group together, said legs disposed in a stacked configuration with said first and second legs transitioning so as to overlie said third leg at different locations along a length of said third leg.

12. An optical circuit according to claim 11 wherein said matrix material of at least said first and second legs comprising a coating such that at least said first and second legs are independent of the flexible substrate.

13. An optical circuit according to claim 11 wherein said plurality of groups of optical fibers extend in a parallel, spaced apart arrangement across a portion of said flexible substrate, and wherein said optical fibers of one group extend toward said optical fibers of another group while the respective groups of optical fibers remain supported by said flexible substrate.

14. An optical circuit according to claim 11 further comprising a first fiber optic connector mounted upon said plurality of legs in the stacked configuration.

15. An optical circuit according to claim 14 wherein each optical fiber extends from a respective first end upon which said first fiber optic connector is mounted, across said flexible substrate to an opposed second end, and wherein the optical circuit further comprises a plurality of second fiber optic connectors mounted upon the second ends of the optical fibers of respective groups.

16. A method of fabricating an optical circuit comprising:
providing a main body comprising a flexible substrate and a plurality of groups of optical fibers proximate an edge of and adhered to the flexible substrate, each group including at least one optical fiber;
positioning a first group of optical fibers so as to overlie a second group of optical fibers; and
coating the first group of optical fibers with a matrix material once the first group of optical fibers is positioned to overlie the second group of optical fibers.

17. A method according to claim 16 further comprising securing the first and second groups of optical fibers relative to one another after positioning the first group of optical fibers so as to overlie the second group of optical fibers.

18. A method according to claim 17 further comprising releasing the first and second groups of optical fibers after coating at least the first group of optical fibers with the matrix material.

19. A method according to claim 18 wherein securing the first and second groups of optical fibers comprises attaching the first and second groups of optical fibers to opposite sides of an adhesive coated spacer while coating at least the first group of optical fibers with the matrix material, and wherein releasing the first and second groups of optical fibers comprises removing the adhesive coated spacer after coating at least the first group of optical fibers with the matrix material.

20. A method according to claim 16 wherein coating the first group of optical fibers comprises spraying a coating of the matrix material onto the first group of optical fibers.

21. A method according to claim 16 further comprising repeating said positioning and coating steps for a third group of optical fibers which also overlies the second group of optical fibers following positioning and coating the first group of optical fibers.

\* \* \* \* \*